Sheet 1. 2 Sheets.
C. Bender,
Suspension Bridge,
No. 3,073, Reissued Aug. 11, 1868.
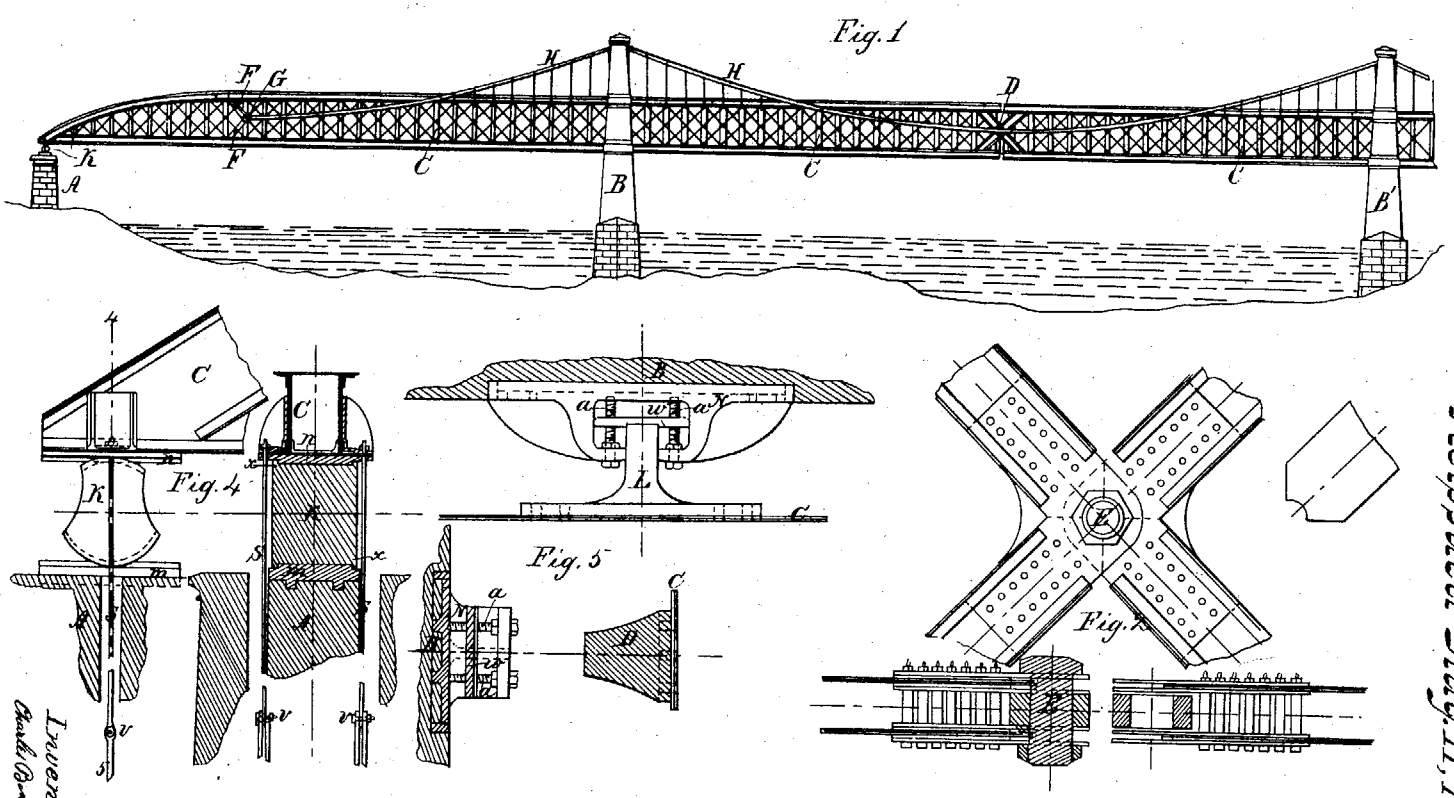
Witnesses
Henry E. Rowden
William Seifer.
Inventor
Charles Bender Sheet 2. 2 Sheets
C. Bender,
Suspension Bridge,
No. 3,073, Reissued Aug. 11, 1868.
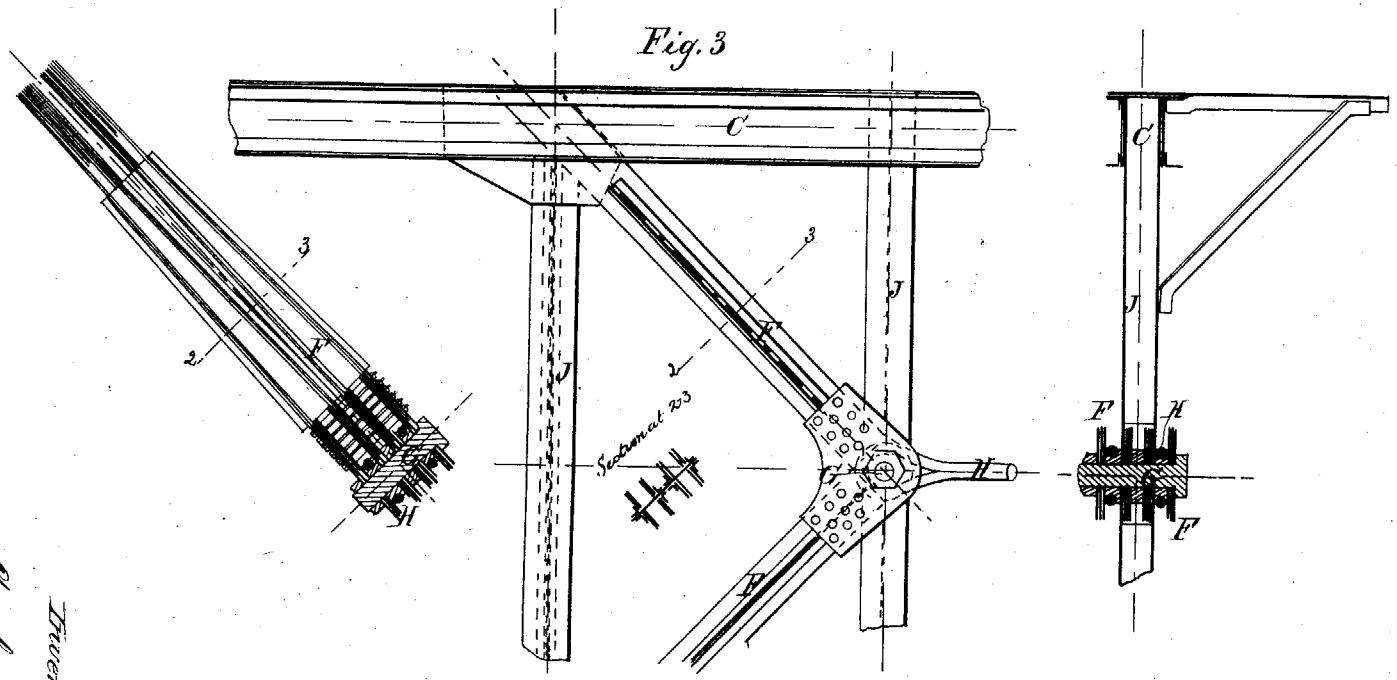
Witnesses
Henry E. Roeder
William Berger
Inventor
Charles Bender

UNITED STATES PATENT OFFICE.

CHARLES BENDER, OF NEW YORK, N. Y.

IMPROVEMENT IN SUSPENSION-BRIDGES.

Specification forming part of Letters Patent No. 71,955, dated December 19, 1867; Reissue No. 3,073, dated August 11, 1868.

*To all whom it may concern:*

Be it known that I, CHARLES BENDER, of New York, in the county and State of New York, have invented a new and useful Improvement in Suspension-Bridges; and I do hereby declare that the following is a full and exact description of the same, reference being had to the accompanying drawings, and to the letters of reference marked thereon.

My invention refers particularly to the different species of suspension-bridges which by any arrangement of trussing are stiffened. The trusses may be parallel to the longitudinal axis of the floor; or the stiffening may consist in a combination of chains or cables, so as to form a stiff curved truss, or may be obtained by a connection of the cables or chains with longitudinal floor-beams by uprights and diagonals, or by diagonals only. All these different species of suspension-bridges may be called "stiffened suspension-bridges."

The nature of my invention consists, first, in dividing or separating the beams or trusses at one or more points and connecting them by yielding joints; further, in the attachment of the chains or cables to the beams or trusses of the bridge itself instead of fastening the same to abutments; further, in the manner of securing the ends of the bridge to the end piers vertically, and in such manner as to allow for the expansion and contraction of the bridge; and, lastly, in leaning the beams or trusses against the piers to prevent sidewise movements at these places, and fastening them at the same time at one pier in such a manner as to prevent any horizontal movement in the direction of the longitudinal axis of the bridge.

Figure I represents a longitudinal elevation of one of my improved bridges belonging to the first class of stiffened suspension-bridges, or with longitudinal trusses C. The remaining figures represent details showing the separate parts on an enlarged scale, and will be more particularly referred to in the description.

In the accompanying drawings, A represents one of the end or shore piers, and B B′ the central piers.

C are the longitudinal trusses, which are to annihilate the momentum of the forces and to repart the weights over the suspenders. These trusses are constructed in the usual manner, subject to many variations, to correspond with the style and nature of the bridge.

D in Fig. I represents the yielding joints at the points where the beams or trusses are separated. One of the many possible plans of strengthening and stiffening these parts of the beams or trusses and joining the same together by means of strong bolts E is represented in Fig. II, Sheet I. By means of the connecting-plates N N, the nuts L, and heads M, or by any other arrangement—as wedges, &c.—I prevent horizontal movements as caused by wind of one or more of the piers of the trusses.

The object of providing one or more yielding joints in the whole length of the beams or trusses is to prevent thereby any danger from the different compressions and expansions of said beams or trusses, as well as of the cables or chains; further, to facilitate thereby the bending of the bridge by change of temperature to equalize any irregularity at the points of support of the structure on the piers; likewise, to facilitate and rectify thereby considerably the analytical calculation of the whole structure, and also to save material. The manner of constructing this joint, as well as the manner of strengthening the adjoining ends of the beams or trusses, is subject to many variations and has to correspond with the style and nature of the bridge. In Fig. I this joint is represented exactly in the center between the central piers, B and B′; but the same may be placed in different positions, and may even be arranged at two or more places, according to the nature and to the number of the spans of the bridge, and may be used for all descriptions of stiffened suspension-bridges.

Between the shore-pier A and the first central pier, B, strong diagonal trusses F F (shown at an enlarged scale in Fig. III, Sheet II) are arranged in the truss-work of the beams, having at their point of junction a strong bolt, G, around which the cables or chains H are fastened. These trusses F transfer the horizontal forces of the cables or chains to the chords or to the beams of the structure, while strong uprights I resist the vertical pressure acting in the system of the trusses F.

It is not essential by what arrangement of details the strains of the cables or chains are transferred to the chords of the trusses or to the beams. In the accompanying drawings, for instance, the trusses F F are exerted by strains, but they could also be placed in inverted position, so as to resist pressures.

The only task to be fulfilled is the right distribution of said forces, and this may be effected by various arrangements of the different parts in a suitable manner, and mathematical examination in each single case will determine the most economical arrangement.

The exact position of the point of attachment of the chains or cables to the beams or trusses depends likewise on circumstances, and may be nearer to or farther away from the shore-pier A, and in some cases it may even be advisable to extend the beams or trusses beyond said shore-pier A, and place the point of attachment beyond said shore-pier. Mathematical and mechanical examination in each single case will determine the most profitable position of these points. By this arrangement of attaching the cables or chains to the beams or trusses a great saving in most cases is obtained, as I dispense thereby with a great part of the expensive masonry at present necessary at each end of the bridge to secure the ends of the cables or chains.

Where the trusses of my suspension-bridges are supported by piers rollers K are placed, provided with flanges X X, fitting over the surfaces of the plates *n* and *m* to prevent any side motion of the bridge at the ends. Instead of one roller, two or more rollers with or without journals, or, to save material, only parts of rollers, could be used.

Arising from any overloading in certain contingencies or in case of wind, it is possible that the trusses or beams on the piers at or near the ends of the bridge have a tendency of an upward movement. To prevent this movement I attach said beams or trusses to the piers in such a manner as to use the weight of the piers as resisting vertical power, said attachment being able to allow the horizontal movement of the bridge in case of change of temperature. At the same time it is necessary to prevent sidewise movement, which might be possible by action of wind, a movement which, in other bridges, where always is an important pressure on the piers, is already annihilated by the friction, great enough to prevent sidewise deviation. One of the many possible ways to fulfill these conditions is shown in Fig. IV in front view and cross-section. Here the ends of the bridge are fastened in the foundation of the piers by heavy bolts. These are provided with suitable joints, *v*, to allow for the horizontal motion, and the said flanges X X are fulfilling the third condition.

To diminish the side motion caused by wind, as well as for other reasons hereinafter mentioned, I cause the longitudinal beams or trusses to bear against the central piers, so as to prevent sidewise movements at these points. This can be done in many ways. One of them is shown in Fig. V.

Projections L are securely attached to the outside of the beams or trusses C at the desired position, which enter into suitable guide-frames, N, fastened to the piers in such a manner as to lean thereby the bridge against the piers, sufficient play being allowed in one or more of the same to allow for the expansion and contraction of the trusses or beams lengthwise. In the frames N, fastened to the piers, suitable plates, *w*, are arranged, against which the projections L, attached to the beams C, are made to bear, said plates being capable of being regulated by means of set-screws *a a*. On that pier which is either in the middle of the bridge or on that next to its center I attach these beams in such a manner as not to allow for any longitudinal motion, whereby the differences of the length of the bridge caused by changes of temperature are regulated and brought to a certainty on either side of this point of attachment.

By the manner of leaning the beams or trusses against the towers to prevent movement sidewise the pressure caused by the wind is partly annihilated, and the side motion of the bridge, caused by wind, is considerably reduced, for my whole horizontal construction represents a truss made stiff against bending horizontal and vertical to the axis of the bridge.

The trusses C, Fig. I, represent the chords, and the horizontal cross-bearers and diagonals between the trusses C, Fig. I, represent the uprights and diagonals of the said truss. Such a single truss bearing against the towers to prevent sidewise movements has already a great effect; but by leaning my continuous truss against the towers and against the end piers of the bridge the whole horizontal trusswork is made a powerful continuous truss against deviations, and it is known that the deformations by continuous trusses are considerably reduced. Further, by my method of leaning the trusses or the beams against the towers to prevent horizontal movements vertical to the axis of the bridge the towers themselves are strengthened, as the pressure resulting from wind, and which in other cases is all on the top of said piers, where the cables or chains are supported, is brought thereby lower down or nearer to its base.

What I claim as my invention, and desire to secure by Letters Patent, is—

1. The construction and arrangement of one or more yielding joints connecting the beams or trusses of stiffened suspension-bridges, substantially as and for the purpose described.

2. The plates N, fitted together as shown in Fig. II, and combined with the fulcrum-bolts E of the yielding joints of the trusses, substantially as and for the purpose set forth.

3. The attachment of the ends of the cables or chains at or near the first or shore piers to the longitudinal beams or to the trusses of stiffened suspension-bridges, substantially as and for the purpose described.

4. The method employed to reduce the side motion of a stiffened suspension-bridge by causing the longitudinal beams or trusses to bear against the several piers by means of projections L, as shown in Fig. V, all constructed and arranged as herein described.

5. The arrangement of a connection which is rigid in a horizontal direction between each truss and one pier, while the connections of said truss with the remaining piers are free to accommodate themselves to expansion and contraction of the beams or trusses, substantially as and for the purposes set forth.

6. The method of connecting the ends of the beams or trusses of stiffened suspension-bridges provided with yielding joints to their respective piers, consisting of links *v*, all arranged as and for the purpose set forth.

New York, December 23, 1867.

CHARLES BENDER.

Witnesses:
M. M. LIVINGSTON,
OTTO WALLAT.